(12) United States Patent
Morita et al.

(10) Patent No.: US 6,976,124 B2
(45) Date of Patent: Dec. 13, 2005

(54) CONTROL METHOD OF CONTROL DEVICE CONDUCTING DATA INPUT AND OUTPUT TO STORAGE DEVICES, AND CONTROL DEVICE USED THEREFOR

(75) Inventors: Seiki Morita, Kanagawa (JP); Masaaki Kobayashi, Kanagawa (JP); Manabu Sakuramoto, Kanagawa (JP); Mikio Fukuoka, Kanagawa (JP); Yutaka Takata, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 269 days.

(21) Appl. No.: 10/327,751

(22) Filed: Dec. 23, 2002

(65) Prior Publication Data

US 2003/0120674 A1 Jun. 26, 2003

(30) Foreign Application Priority Data

Dec. 25, 2001 (JP) .................................... 2001-392655
Feb. 15, 2002 (JP) .................................... 2002-039208

(51) Int. Cl.⁷ ............................................ G06F 12/00
(52) U.S. Cl. .............................. 711/114; 713/1; 714/6; 711/166
(58) Field of Search ........................ 711/114; 714/5–7, 714/42; 710/10

(56) References Cited

U.S. PATENT DOCUMENTS 6,467,023 B1 * 10/2002 DeKoning et al. .......... 711/114
6,665,743 B2 * 12/2003 Benhase et al. ............... 710/10
6,681,291 B2 * 1/2004 Ikeuchi et al. ............... 711/114
6,813,687 B1 * 11/2004 Humlicek .................... 711/114
2003/0131163 A1 * 7/2003 Ishii et al. ..................... 710/52
2003/0233596 A1 * 12/2003 Corbin et al. ................... 714/5
2004/0068612 A1 * 4/2004 Stolowitz ..................... 711/114
2004/0215877 A1 * 10/2004 Chatterjee et al. .......... 711/114
2004/0216012 A1 * 10/2004 Ashmore et al. ............. 714/42
2004/0221102 A1 * 11/2004 Watanabe .................... 711/112

FOREIGN PATENT DOCUMENTS

JP          09-330180        12/1997

* cited by examiner

Primary Examiner—Donald Sparks
Assistant Examiner—Jesse Diller
(74) Attorney, Agent, or Firm—Townsend and Townsend and Crew LLP

(57) ABSTRACT

When a request to conduct format process is received from the external device, a write history management table which records histories of conducted writing processes in block units is referred to confirm whether or not writing process has been conducted to the block. As a result of the confirmation, the format process is conducted to only a block, which a writing process has not been conducted, and a history of conducting the writing process of the formatted block is recorded. In conducting the format process, when a request is received to conduct reading process and/or writing process from the external device, the write history management table is referred, and only in a case that a writing process has been conducted to said block, the disk array device is accessed and a reading process and/or writing process is conducted to the block.

12 Claims, 16 Drawing Sheets

Subgroup of hard disks 114

| | Disk 1 | Disk 2 | Disk 3 | Disk 4 | Disk 5 |
|---|---|---|---|---|---|
| Data stripe 1 | Data 1 | Data 1 | Data 1 | Data 1 | Redundant Data 1 |
| Data stripe 2 | Data 2 | Data 2 | Data 2 | Redundant Data 2 | Data 2 |
| Data stripe 3 | Data 3 | Data 3 | Redundant Data 3 | Data 3 | Data 3 |
| Data stripe 4 | Data 4 | Redundant Data 4 | Data 4 | Data 4 | Data 4 |
| ... | ... | ... | ... | ... | ... |

FIG. 3

CONTROL METHOD OF CONTROL DEVICE CONDUCTING DATA INPUT AND OUTPUT TO STORAGE DEVICES, AND CONTROL DEVICE USED THEREFOR

CROSS REFERENCE TO RELATED APPLICATION

The present application claims priority upon Japanese Patent Application No. 2001-392655 filed on Dec. 25, 2001 and Japanese Patent Application No. 2002-039208 filed on Feb. 15, 2002, which are herein incorporated by reference.

BACKGROUND OF THE INVENTION

1. Field of the Invention

The present invention relates to a controlling method of a control device controlling data input and output to a plurality of storage devices, and a control device used in the method, and particularly relates to a disk array device, and a controlling method thereof.

2. Description of the Related Art

Recently, there have been an increasing number of situations which require large amounts of data to be stored, such as meteorological information or digital broadcasts for the transmission of high-definition television. As a result, larger capacities are required for external storage devices that are used to store this data. One method of reliably storing large amounts of data is by using a disk array device referred to as RAID (Redundant Arrays of Inexpensive Disks) which is equipped with a plurality of magnetic disks. Thus, efforts have been made to increase data processability by dispersing and storing data in a plurality of magnetic disks and to increase reliability by storing redundant data.

An example of a RAID disk array device is disclosed in the paper, "A Case for Redundant Arrays of Inexpensive Disks (RAID)", by David A. Patterson, Garth Gibson, and Randy H Katz of the Computer Science Division of the Electrical Engineering and Computer Sciences Department at the University of California, Berkeley.

As described above, this disk array device has a larger capacity, higher conductance, and greater reliability as compared to a device with a single magnetic disk. Accordingly, these disk array devices are now being employed in such diverse settings such as television stations, banks, hospitals, research laboratories, and universities.

As is well known, since parity calculation and the like are necessary at the time of the initial installation of the disk array device, a process of writing initialization data to all storage regions in the disk unit (storage device), namely a logic format, is necessary.

There are two methods of logic format which are used: simple format (or quick format) and format with data-verifying function.

In simple format, the portion corresponding to data in the object to be formatted is not examined, and only the portion corresponding to the header is rewritten. As an example of using simple format, a technique disclosed in Japanese Patent Application Laid-open No. Hei 9-330180 is referred to. With the technique described in this publication, a generation state of parity is managed for each stripe group in the RAID disk array, and by determining the algorithm of parity calculation when data is written according to the state, the requirement for performing a logic format is abolished at initial installation.

Although simple format has the advantage of completing the format instantly, its reliability is low and an error can possibly occur in data that the user has written. In particular, if there is an error such as a letter encoding or decoding error, the data cannot be recovered.

In order to avoid such problems, it is necessary to verify data at the time of format. There are three methods of format with data-verifying function (a), (b), and (c) which can be utilized in response to a format request from a host device: (a) an initial value of data is written in the data storing area to be formatted; (b) when a RAID composition is employed, redundant data calculated from initial value data is written in all of redundant data storing regions to be formatted; and (c) both (a) and (b) are performed.

When format with data-verifying function is employed in an external storing device (including a disk array device) requiring reliability, a command to the magnetic disk devices is given, which requires a format process time proportional to the size of a region to be formatted to complete.

An improved technique of such a format process is disclosed in the Japanese Patent Application Laid-open No. Hei 3-4315, where firmware in a sub-system is provided with a format function in respect to a format request from a host device. Thus, the device may conduct formatting in the subsystem independently from the host device.

A format for securing reliability in this way is carried out primarily when the external storage device is initially installed, or when the number of magnetic disks are increased and the amount of data regions for users is newly increased.

When a disk array device is initially installed and a format with data-verifying function is performed, all areas used for storing data that are mounted to a magnetic disk device must be formatted at once. Thus, there arises a problem where a format time proportional to the increase of storage capacity is required.

In recent systems, storage capacity has been increasing in large amounts, which usually requires several days for the entire format. Furthermore, when increasing the number of magnetic disks used, it is necessary to format all newly added areas for storing data, which requires a format time proportional to the increase of storage capacity. Thus, when a format process is occurring, the system cannot respond to data input and output orders from external devices.

In regards to a storage system whose capacity is assumed to continually increase, simple format has an advantage in that formatting is completed instantaneously, but it has a disadvantage in that reliability decreases, as described previously. On the other hand, format with data-verifying function has an advantage in that reliability is high, but the disadvantage is that time taken until the format is complete is extremely long.

With the technique disclosed in Japanese Patent Application Laid-open No. Hei 10-3358, in response to a format request from a host device, completion of a format process is instantly reported, and that format process is performed in a subsystem. However, in this technique, the subsystem that is in the process of formatting cannot receive and process I/O requests from the host computer.

SUMMARY OF THE INVENTION

One of the purposes of the present invention is to provide a disk array device, and a control method thereof to solve the problem mentioned previously.

In order to achieve the purpose described above, a disk array device with a plurality of disk devices which is connected to an external device is presented. When the disk array device receives a request to perform a format process from the external device, a write history management table which records histories of performed writing processes in block units is accessed to confirm whether a data writing process regarding the relevant blocks has previously occurred. As a result of the confirmation, the format process is not performed to the blocks where a writing process has already been performed, but rather only to the blocks to where a writing process has not been performed. A history of having already performed the writing process is then recorded for the formatted blocks in the write history management table. When a request to perform a read/write process is received from the external device during a format operation, the write history management table is then accessed. If a writing process has previously been performed to the relevant blocks as indicated by the write history management table, then the disk array device is then accessed and the current read/write process is performed to the blocks.

BRIEF DESCRIPTION OF THE DRAWINGS

For a more complete understanding of the present invention and the advantages thereof, the following description is referenced taken in conjunction with the accompanying drawings wherein:

FIG. 3 is a figure showing a data structure of a disk array of hard disks composing of five magnetic disks and having redundant data according to an embodiment of the present invention;

DETAILED DESCRIPTION OF THE INVENTION

Figure 1:
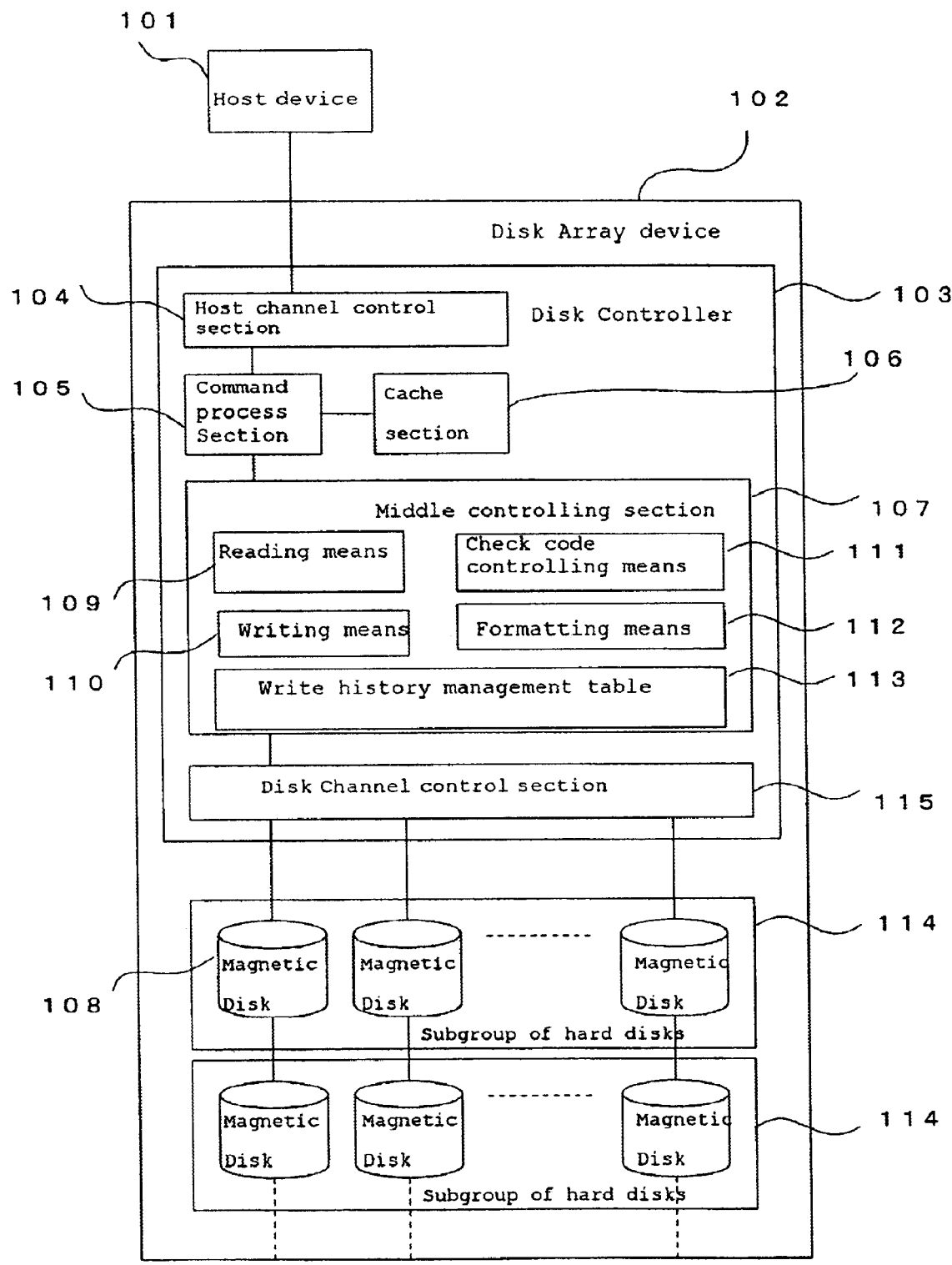
FIG. 1 is a block diagram showing an example of a composition of a disk array device according to an embodiment of the present invention.

In the first embodiment of the present invention, a format technique is provided that has both the advantages of simple format and format with data-verifying function as described above. In other words, a technique is provided by which a read (read out) request and a write (write in) request may be received from a host device (external device) while the disk array device is in a state of performing a format with data-verifying function. With this formatting means, the format used has a high reliability and can be completed in a short time.

The disk array device has a magnetic disk device comprising a plurality of magnetic disks and a disk controller controlling the disk device.

Data that has been split into block units and redundant data derived from the data are dispersed and stored in the plurality of magnetic disks.

The disk controller comprises a host channel controlling section, a command processing section, a cache section (cache memory), and a middle controlling section. The host channel controlling section receives a request an I/O request from the host device (external device). The command processing section processes the request received from the host device. The cache section may be accessed at a higher speed than the magnetic disk. A disk channel controlling section issues an I/O request to the magnetic disks. A middle controlling section is composed of a processor having a hardware structure and a control memory, and it controls a plurality of magnetic disks.

The middle controlling section has read (read out) means, write (write in) means, check code controlling means, formatting means, and a write history management table. The respective means are realized by-the operation of the processor based on control data and a control program which are stored in the control memory. The read means reads data from the magnetic disks. The write means writes data to the magnetic disks. The check code controlling means reads and writes redundant data to the magnetic disks. The formatting means formats the magnetic disks.

The write history management table is stored in the control memory and includes management information for judging whether or not data has been written to the magnetic disks. Specifically, in managing data regions (both the user data region and the redundant data region), the write history management table splits the region into block units, and discriminates between blocks in which data has been written to at least once and blocks in which data has not. This management technique is known as bitmap management.

The read means determines whether or not certain data exists in the cache section. When the data is already in the cache section, it is transferred from the cache to the host device. On the contrary, when there is no such data in the cache section, management information in the write history management table is accessed. For blocks to which writing has not yet been performed, predetermined data is created and sent to the host device. For blocks to which writing has been performed, after reading the data from the magnetic disk and writing it to the cache section, the data is transferred to the host device.

The write means refers to management information of the write history management table. For writing to areas which have been written to before, the write means performs the same process as the conventional writing process. On the other hand, for writing to areas which have not been written to before, the write means creates format data in the smallest unit in the cache section and receives write data from the host device. This means for an area which has not been formatted, the write means does not write directly to a magnetic disk which takes time to be accessed like a conventional writing process, but instead creates data in the smallest stripe unit in the cache which may be accessed at a high speed. Write completion is then reported to the host device. Independent from the host device, the write means writes data in a stripe in the cache to the magnetic disk in stripe units. As a result, before the write means writes data to the magnetic disk, it responds to the host device by reporting write completion. Thus, the delay of process response to the host device becomes smaller. Furthermore, the write means writes all of the data of the cache section to the magnetic disk in stripe units. Thus, when the write means writes only a part of the stripe to the magnetic disk, a series of processes of reading out, revising and writing between the cache section and the magnetic disks becomes unnecessary.

When the formatting means writes predetermined data to both the user data region and the redundant data region, it also updates management information of the write history management table. In response to the request to perform a format from the host device, completion is instantly reported (to the host device) so that it may respond to an I/O request from the host device.

When there are no I/O requests from the host device, format of the disk array device system proceeds by the formatting means writing predetermined data to the user data region and the redundant data region. According to this process, the formatting means changes the management information (block units) of the write history management table from "there is no writing of data" to "there is writing of data".

During this format operation, when an I/O request from the host device occurs, by using the read means and the write means, format of the disk array device is performed in parallel with the I/O process from the host device, and finally format in the disk array device system is completed. Thus, a highly reliable format which may not be achieved by the simple format method described above can be completed. Since the command processing section reports the format completion to the host device almost instantaneously, the size of the storage capacity of the area for storing data and the area for storing the redundant data do not influence the time required for the format to complete.

The present inventors have created a novel technique in which a control device controlling data input and output to a plurality of storage devices such as the disk array device is utilized without requiring a logic format at the time of initial installation and created an embodiment of the invention. This is completely different from the conventional techniques used such as those stated in the above laid-open publications.

The second embodiment of the present invention provides an operating method of a control device controlling data input and output to the plurality of storage devices and a control device used in this method, in which the control device controlling data input and output to the plurality of storage devices such as the disk array device is made usable without performing a logic format at the time of initial installation.

In order to achieve this object, the data input and output to the plurality of storage devices is controlled by the method of the control device of the present invention. This method is characterized in that data is input and output in block units into which a storage region of the storage device is divided, and the data is stored if data has been previously written to the plurality of data stripes formed by data blocks in the plurality of storage devices. In writing data to the storage device, when a writing process has not been performed in the past to the data stripe to which the data block to be written to belongs, then the data is written to the data block, and initialization data is written to the other data blocks belonging to the data stripe to which the data block belongs.

Embodiment 1

FIG. 1 shows a schematic block diagram of an entire structure of an embodiment of the present invention. A disk array device 102 comprises a disk controller 103 and one of a plurality of subgroups of hard disks 114. This subgroup of hard disks 114 is composed of N (N is a natural number) magnetic disks 108.

The disk controller 103 comprises a host channel controlling section 104, a command processing section 105, a cache section 106, a middle controlling section 107, and a disk channel controlling section 115. The host channel controlling section 104 is connected to a host device 101 and receives an I/O request. The command processing section 105 processes the request that the host channel controlling section 104 receives. The cache section 106 comprises a high-speed memory for data cache and may be accessed at a higher speed than a magnetic disk. The middle controlling section 107 controls a plurality of magnetic disks 108.

The disk channel controlling section 115 issues an I/O request to the magnetic disk. As described above, the middle controlling section 107 comprises a control memory and a processor as hardware structures, and additionally comprises a read means 109, a write means 110, a check code controlling means 111, a formatting means 112, and a write history management table 113, as software structures. Each of these means 109 to 112 are realized by the processor operating based on control data or a control program stored in the control memory. The write history management table 113 is stored in the control memory. The read means 109 reads data from the magnetic disk 108. The write means 110 writes data to the magnetic disk 108. The check code controlling means 111 reads and writes redundant data to the magnetic disk 108. The formatting means 112 formats the magnetic disk 108. The write history management table 113 includes management information for judging whether or not data has been written in the magnetic disk 108.

Figure 2:
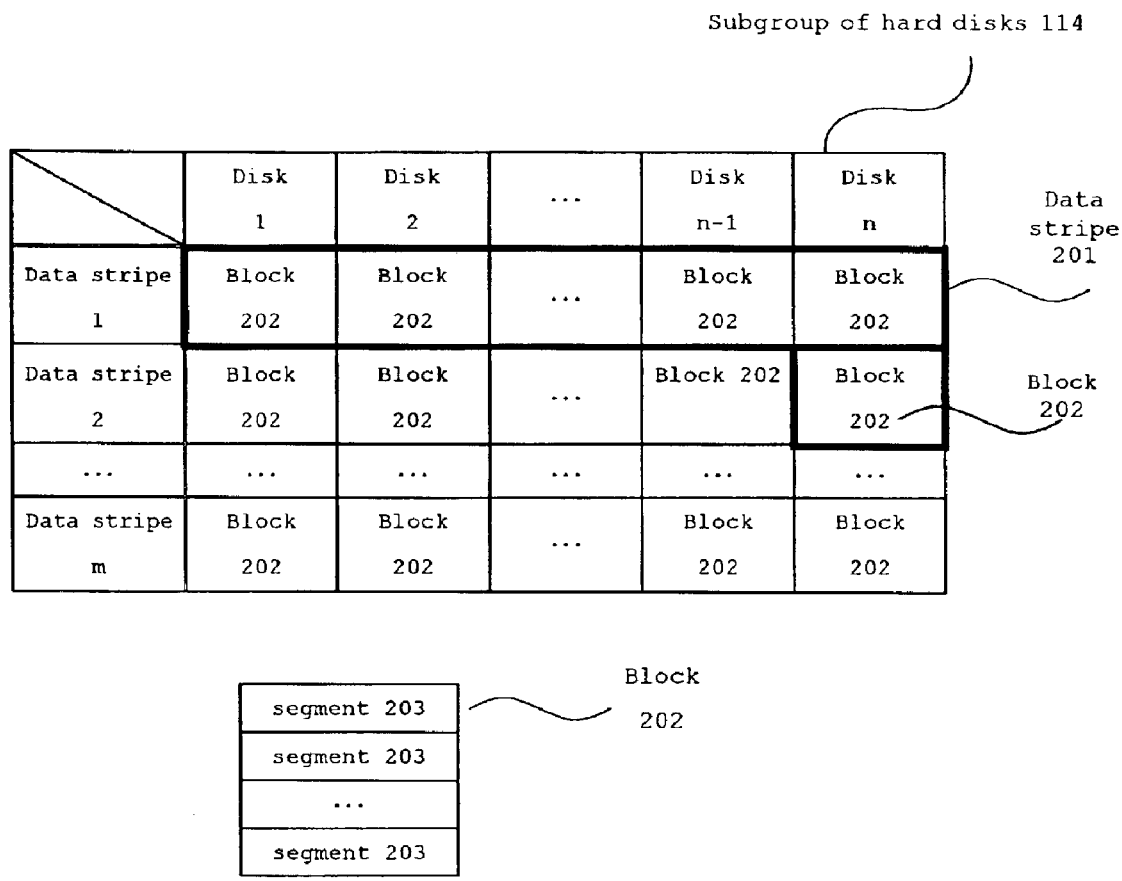
FIG. 2 is a figure showing a schematic structure of a disk array of hard disks according to an embodiment of the present invention.

FIG. 2 shows a schematic data structure of the subgroup of hard disks 114. The subgroup of hard disks 114 is structured of N magnetic disks 108. Further, this subgroup of hard disks 114 is also composed of M (M is a natural number) stripe (block) arrays 201. One data stripe 201 is composed of the same number of N blocks 202 as the magnetic disk 108. One block 202 is composed of one or a plurality of segments 203. Data is read and written in segment units 203.

As a specific example of a data structure shown in FIG. 2, a data structure of a subgroup of hard disks 114 that is composed of five magnetic disks 108 (N=5) and includes redundant data is shown in FIG. 3. As shown in FIG. 2, data is split into data stripe units 201, a block 202, and a segment 203 (in order of size), and stored in the magnetic disk 108. In the data structure shown in FIG. 3 there exists redundant data, but a structure of a subgroup of hard disks 114 without redundant data is possible. Further, the placement of redundant data in FIG. 3 is one example, and as long as it is in the same data stripe, it may exist on any magnetic disk.

Figure 4:
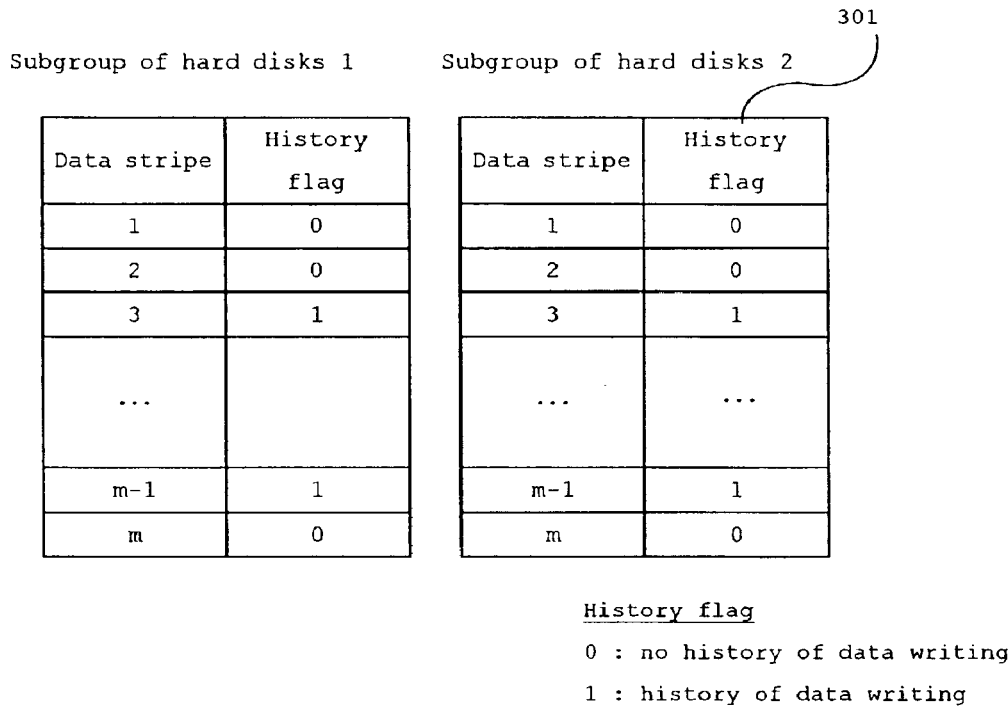
FIG. 4 is a table showing an outline of a data structure of a write history management table 113 according to an embodiment of the present invention.

Next, FIG. 4 shows an outline of a data structure of the write history management table 113. For the M data stripes 201 existing in a certain subgroup of hard disks 114, there are prepared history flags 301 respectively. When the history flag 301 is "0", it shows that there is no history of data writing in the corresponding data stripe, meaning data has not been written even once. Further, when the history flag 301 is "1", it shows that there is a history of data writing in the data stripe, meaning data has been written at least once.

Figure 5:
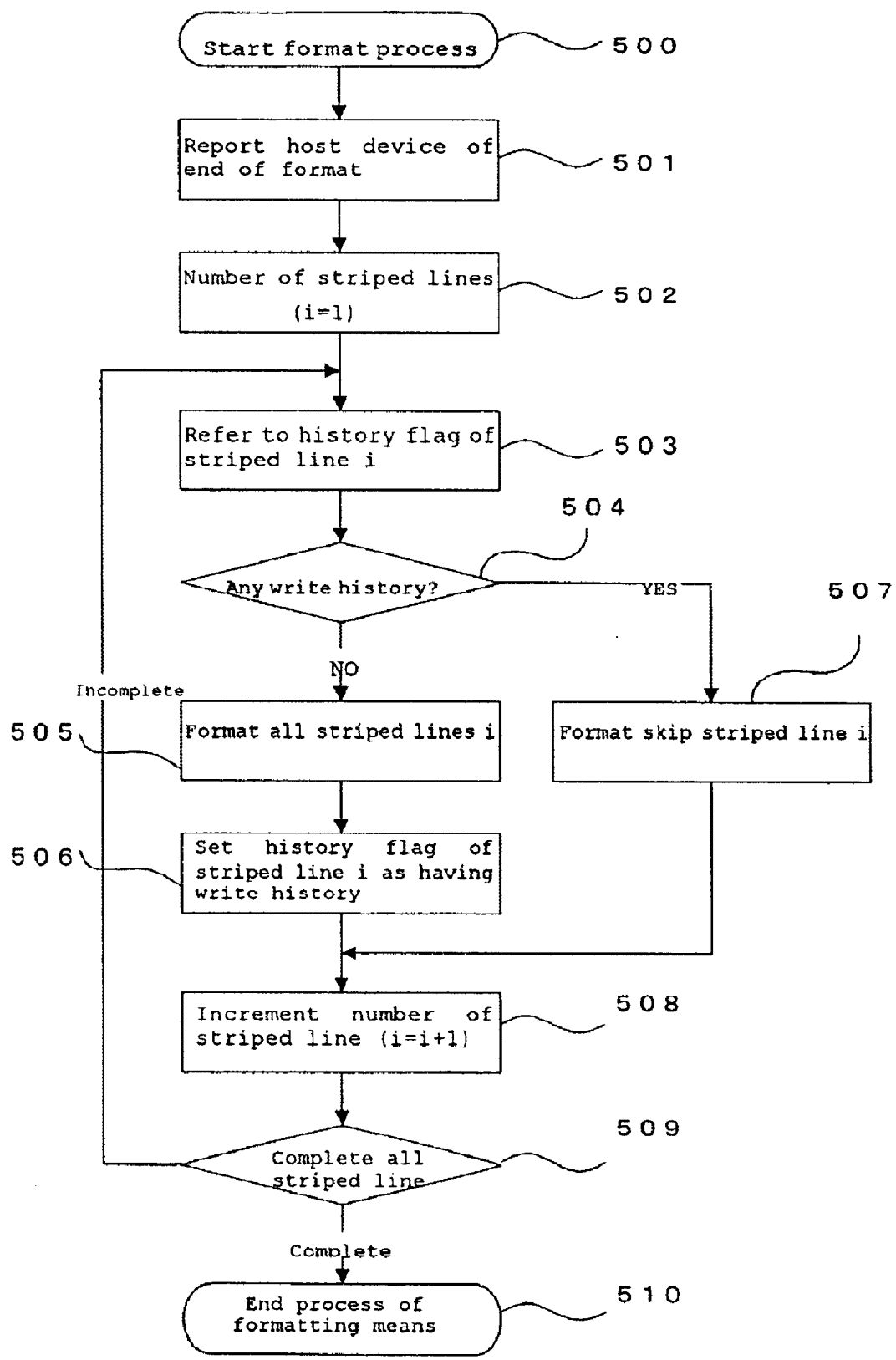
FIG. 5 is a flowchart showing operation of a formatting means according to an embodiment of the present invention.

A specific format process is described in a flowchart in FIG. 5 of operations of the formatting means 112. Formatting means 112 operates when a format request is given to the disk array device 102 from a host device 101. When the formatting means 112 receives a request to perform a format, only the smallest area like management information relating to a disk capacity is formatted, and the host device 101 is reported instantly of the completion of the format (501).

Then, after the completion of a report of the end of the format, the formatting means 112 starts the format process from a data stripe with number "1" (number i=l) (501). The formatting means 112 allows the format process to proceed by incrementing in data stripe units, and the process is completed when the last data stripe (number i=m) (510) is formatted.

As a specific operation of this format process, first, a history flag 301 of the data stripe in the write history management table 113 is accessed (503), and when there is no write history (504: NO), a format of the entire data stripe is performed (505). Then, the history flag 301 of the data stripe which performs the format is changed to "1" (there is history of data writing) (506), and the number of the data stripe which is an object of the format process is incremented (508), and it is confirmed whether or not processes to all data stripes have been completed (i=m?). When the processes to all data stripes have not been completed (i<m) yet, it moves on to the process of the next data stripe (509→503). On the contrary, when processes to all data stripes have been completed (i=m), process by the formatting means is completed (509 →510). In the case of a data stripe that has a write history in the write history management table 113 (504: YES), this data stripe has already been written with some kind of data by the write means 110. Therefore, this data stripe is processed with a format skip (do nothing) (504→507), and the above described processes after step 508 are performed.

Figure 6:
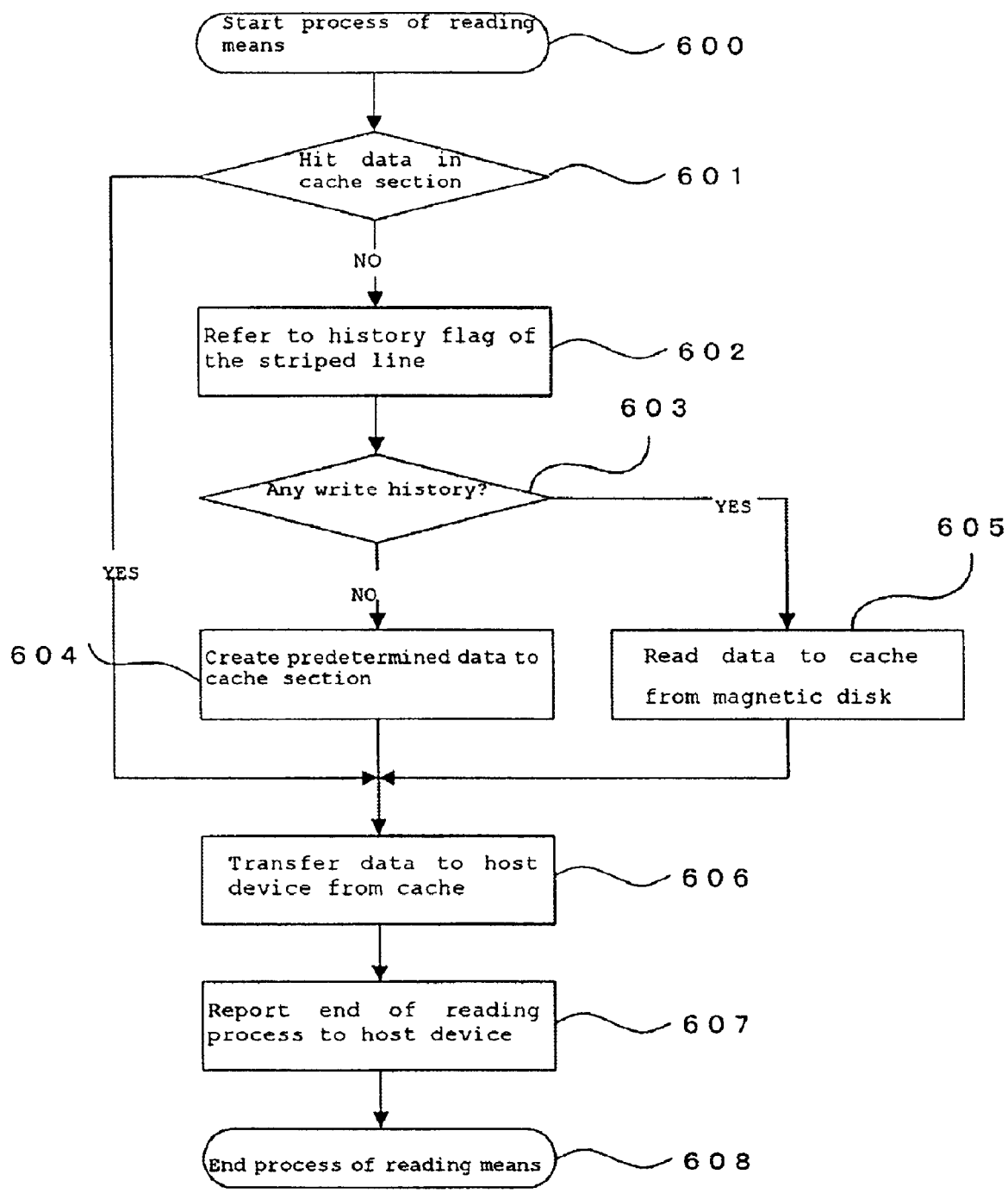
FIG. 6 is a flowchart showing operation of a read means according to an embodiment of the present invention.

Next, a specific reading process is described. The flowchart of FIG. 6 shows operation of the read means 109. This read means 109 operates when the disk array device 102 is given a read request from the host device 101. In this embodiment, even in a state where a format process is being performed to the magnetic disk 108, a reading operation may still be performed.

First, as shown in FIG. 6, it is determined whether or not data requested from the host device 101 in the cache section 106 (601) exists. When data already exists in the cache section 106 (601: YES), the data is transferred from the cache section 106 to the host device 101 (606), and the host device 101 is notified of the end of the reading process (607) to complete the entire process (608).

On the other hand, when data does not exist in the cache section 106 (601: NO), the history flag 301 of the data stripe in the write history management table 113 is accessed (602). When there is a write history (603: there YES), data is read from the segment 203 in the magnetic disk 108 to the cache section 106 (605). Thereafter, data is transferred from the cache section 106 to the host device 101 (606), and the end of reading process is reported to the host device 101 (607) to complete the process (608).

On the other hand, as a result of accessing the history flag 301 of the data stripe in the write history management table 113 (602), if there is no writing history (603: NO), predetermined data (all "0" regarding user data) is created in the cache section 106 (604). This data is then transferred from the cache section 106 to the host device 101 (606). Thereafter, the host device 101 is reported of the end of the reading process (607) and the reading process is completed (608).

In other words, when there is no write history regarding the data stripe to be read, it means that the data to be read does not exist on the magnetic disk side. Thus, data of zero is generated and temporarily stored in the cache section 106, and this data is sent to the host device 101. In this case, in order to read out data, the magnetic disk does not have to be accessed. Thus, the format process that is being performed is not interfered with and its progress is not impeded.

The operation of reading data from the magnetic disk to the cache section when a write history exists (603: YES) is a case where there is a write history regarding a data stripe with the data stored in the magnetic disk. In other words, the data stripe has either been already formatted, or data has been written in it before. Therefore, as described in steps 504→507 in FIG. 5 showing the format process, the formatted data stripe to be read is not given a format request from the host device again. Thus, when data is read from the magnetic disk to the cache section in step 605, the format process that is being performed is not interfered with and its progress is not impeded.

Figure 7:
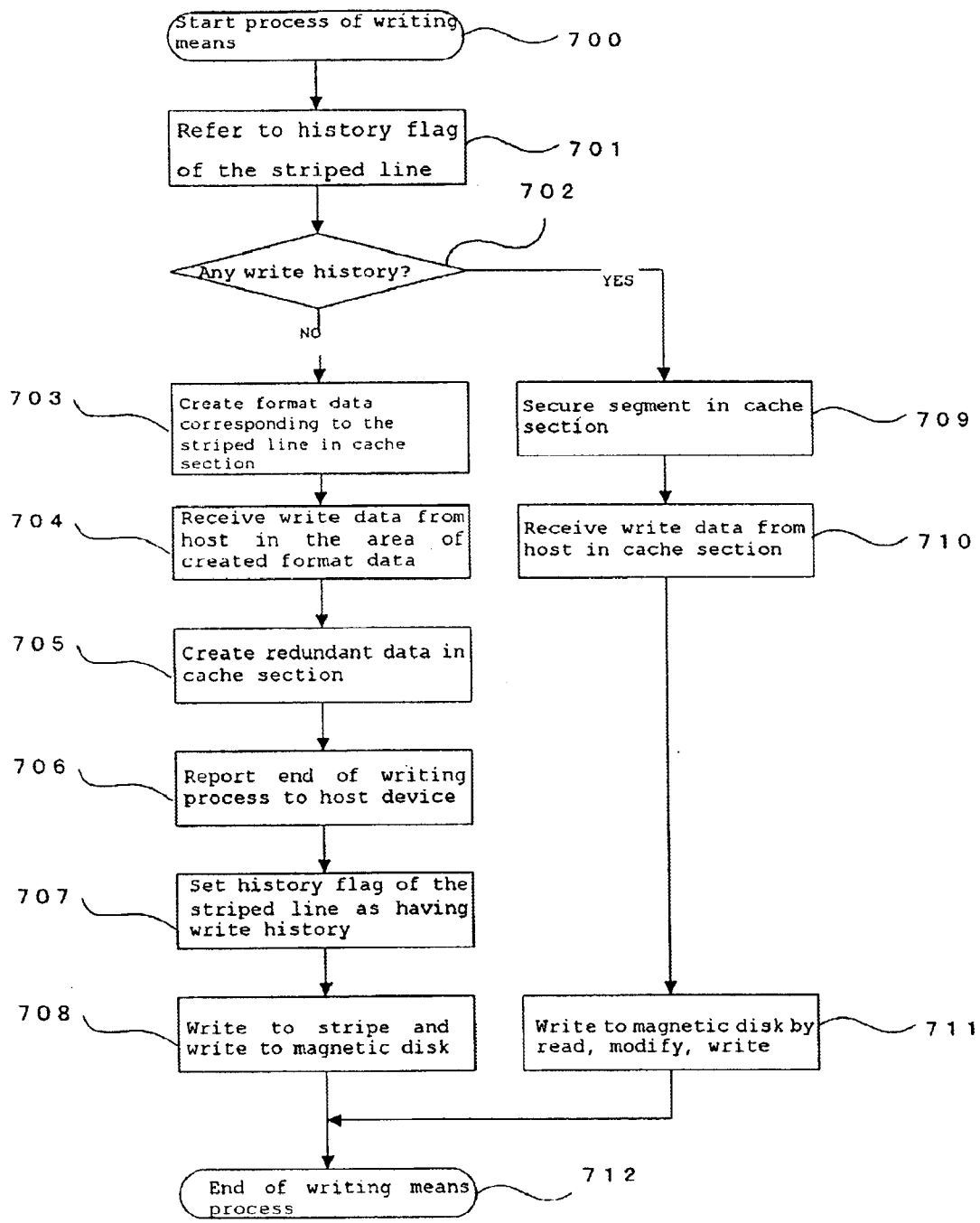
FIG. 7 is a flowchart showing operation of a write means according to an embodiment of the present invention.

Next, a specific writing process is described. FIG. 7 is a flowchart showing the operation of the write means 110. The write means 110 operates when there is a write request from the host device 101 to the disk array device 102. Even if formatting is being performed to the magnetic disk 108, this reading operation may still be performed.

First, as shown in FIG. 7, when the write means 110 receives a transfer request of write data from the host device 101, it refers to the write history management table 113, and accesses the history flag 301 corresponding to the data stripe including the requested area (701). When it is determined that there is no write history to the stripe column (702: NO), format data of the entire stripe column is generated in the cache section 106 (703) and stored. The area of the cache section 106 in which this format data is stored also stores the write data received from the host device 101 (704). Next, redundant data is created from data of the data stripe of the update cache section 106 (705) and stored, and thereafter the host device 101 is reported of the completion of the writing process (706). By creating the redundant data, the validity of the data is assured. After setting the history flag 301 corresponding to the data stripe as having been written to (707), the writing process of the data stripe units to the magnetic disk 108 is actually performed (708), and the process is completed (712).

On the other hand, when there is a write history to the data stripe (702: YES), a segment 203 is secured within the cache section 106 as a data writing region (709), and write data which is received from the host device 101 (710) is stored in the segment 203. Regarding the data stripe including the segment in the magnetic disk, a series of operations comprising of reading, revising, and writing (read-modify-write) are performed, to complete the writing process (711) to the magnetic disk (712).

As described previously, when there is no write history of the data stripe to be written to (processes of steps 701 to 707), a series of continuous operations are performed. This means that access to the data stripe to which data is written is not allowed and the format process in respect to the data stripe is not performed, between the time when there is no write history in step 702 to the time when a write history exists in step 707. If the data stripe to which data is written is set as having a write history in step 707, then that data stripe is not formatted, as described in steps 504 to 507 of FIG. 5. When data is written to the magnetic disk in step 708, the format process that is being performed is not interfered with and its progress is not impeded.

The data writing to the magnetic disk in the above step 711 is a case where there is a write history in the data stripe in the magnetic disk (702: YES). In other words, the data stripe is either already formatted, or has been written with data before. Therefore, as described in steps 504 to 507 in FIG. 5 that shows the format process, a format request is not provided again for the formatted data stripe that is to be written to. This means when data is written to the magnetic disk in step 711, the format process that is being performed is not interfered with and its progress is not impeded.

Figure 8A:
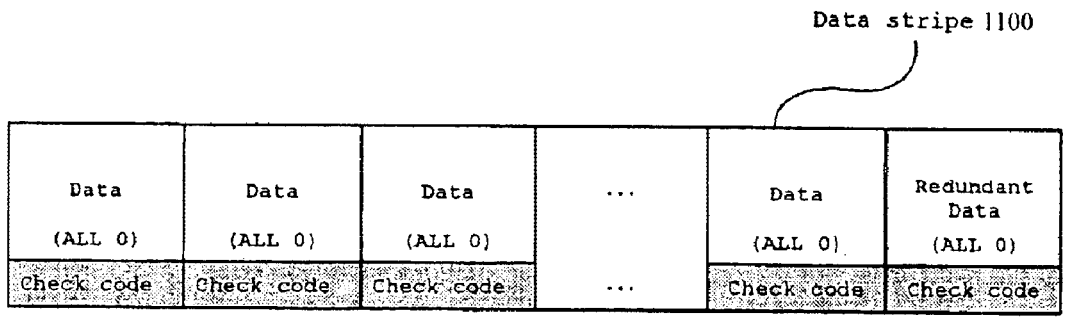
FIGS. 8A to 8C are tables showing the state of transition of a stripe that is created in a cache section while a write means is operating according to an embodiment of the present invention.
Figure 8B:
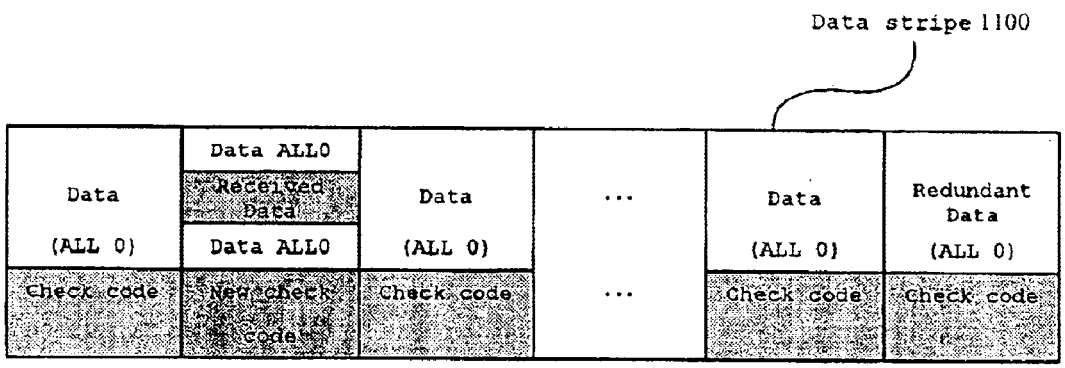
Figure 8C:
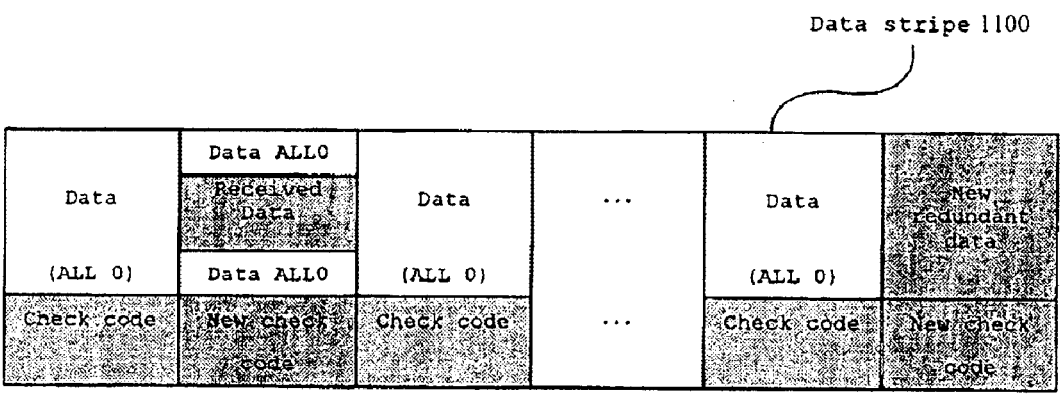

In the operation of the write means 110 described herein, the transition of a data structure within a data stripe created in the cache section 106 is shown in FIGS. 8A to 8C. FIG. 8A shows a data structure of a state where format data for all the data stripes is created in the cache section 106 (step 703 in FIG. 7). FIG. 8B shows a state where write data is received from the host device (step 704 in FIG. 7), the received data is stored in a segment belonging to the second block from the left in the data stripe, and a new check code is given to the block. FIG. 8C shows a stage where new redundant data is created (step 705 in FIG. 7), the new redundant data is stored in the rightmost block, and a new check code is given to the block.

When an access lamp of the magnetic disk device is lighted, the magnetic disk device is in operation. In the case of a simple format using a conventional technique as described above, since only the portion corresponding to a header is rewritten, the format process is completed instantaneously. Therefore the lighted state of the access lamp in this format process is instantaneous. Furthermore, in the case of the conventional technique of format with data-verifying function as described above, logic format is actually performed, thus lighting (flashing) of the access lamp continues during such time, which can last for several days in some cases.

According to the embodiment of the present invention as compared to with the conventional technique as described above, since logic format is performed after the format completion has been reported to the host device, the lighting (flashing) of the access lamp continues during that time.

Furthermore, when a disk array device receives a request issued by the host device, the amount of time before a response is sent is important. In the case of the conventional technique of simple format, since only the portion relating to a header is rewritten, the format process is completed instantaneously. Therefore, after issuing a request for format to the disk array device, the host device may issue an I/O request (request to read and write data) immediately. The disk array device may perform an operation according to this I/O request. Further, since logic format is actually performed during the time (for several days in some instances) when the conventional technique of format with data-verifying function is used, even if the host device issues an I/O request to the disk array device, it will receive an error (wait) response.

Compared to the conventional techniques described above, according to an embodiment of the present invention, when the disk array device receives a format request from the host device, it instantly reports completion of the format to the host device, and thereafter actually performs logic format. Therefore, after the host device issues a format request, it instantly receives report of format completion, and may issue an I/O request to the disk array device. The disk array device then performs a process according to this I/O request, and continues the process of logic format in the background.

In a format process of this embodiment, the write history management table is accessed to confirm whether or not a write process has occurred to the data stripe. As a result of this confirmation, when the write process is completed, the format process of the stripe is not performed. During this format process, when a request to perform reading and/or writing processes is received from an external device, the write history management table is accessed. In the case when a write process of the stripe has completed meaning that the stripe is not to be formatted during the format process, the disk array device is accessed and the reading and/or writing processes are performed to the stripe. Therefore, the ongoing format process is not impeded, and it is possible to perform reading and/or writing processes with the external device.

Furthermore, a format process that has features of both simple format and format with the data-verifying function may be realized. This format process may have both an instantaneous completion of formatting which is a feature of simple format, and the high reliability of format with data-verifying function. For example, a disk array device having a plurality of magnetic disks requires formatting of a user data region as an initial operation at the time the system is installed. In this case, since format completion is instantaneously reported in respect to the format request from the host device, it becomes possible to answer the I/O request from the host device at that time. In actuality, after reporting the format completion, the I/O request is received from the host device, and the format with data-verifying function of the magnetic disk gradually proceeds.

When a request to read data is received, if there is no write history for the data stripe that is to be read from, it means there is no data to read at the magnetic disk side. Thus, data of zero is created and temporarily stored in the cache section, and this data is sent to the host device. In this case, the magnetic disk is not accessed to read data. Thus, the format process that is being performed is not interfered with or impeded.

On the other hand, a data reading operation from the magnetic disk to the cache section when there is a write history regarding the data stripe that is to be read from is a case where a write history exists regarding the data stripe on which the data is stored in the magnetic disk. This means the data stripe is either already formatted, or has been written with data before. Therefore, a format request is not given again to the formatted data stripe that is to be read from. When data is read to the cache section from the magnetic disk, it does not interfere with the format process that is being performed, and the format process is not impeded.

Further, when a data write request is received and there is no write history regarding the data stripe to be written to, a format to this data stripe is prohibited. The process of writing to the data stripe is not allowed to proceed from the time when there is no write history until it is updated as having a write history, and the format process is not performed to the data stripe. If the data stripe to be written to does not have a write history, a format process is not performed to this data stripe. This means while data is written to the magnetic disk, the format process that is being performed is not interfered with or impeded.

On the other hand, when there is a write history in the data stripe of the magnetic disk (702: YES), the data stripe is already formatted, or has been written with data before. Therefore, for a formatted data stripe that is to be written to, a format request is not given again. Thus, when writing data to the magnetic disk, the format process that is being performed is not interfered with or impeded.

Next, other embodiments of the invention are described using FIGS. 9 to 16.

Figure 9:
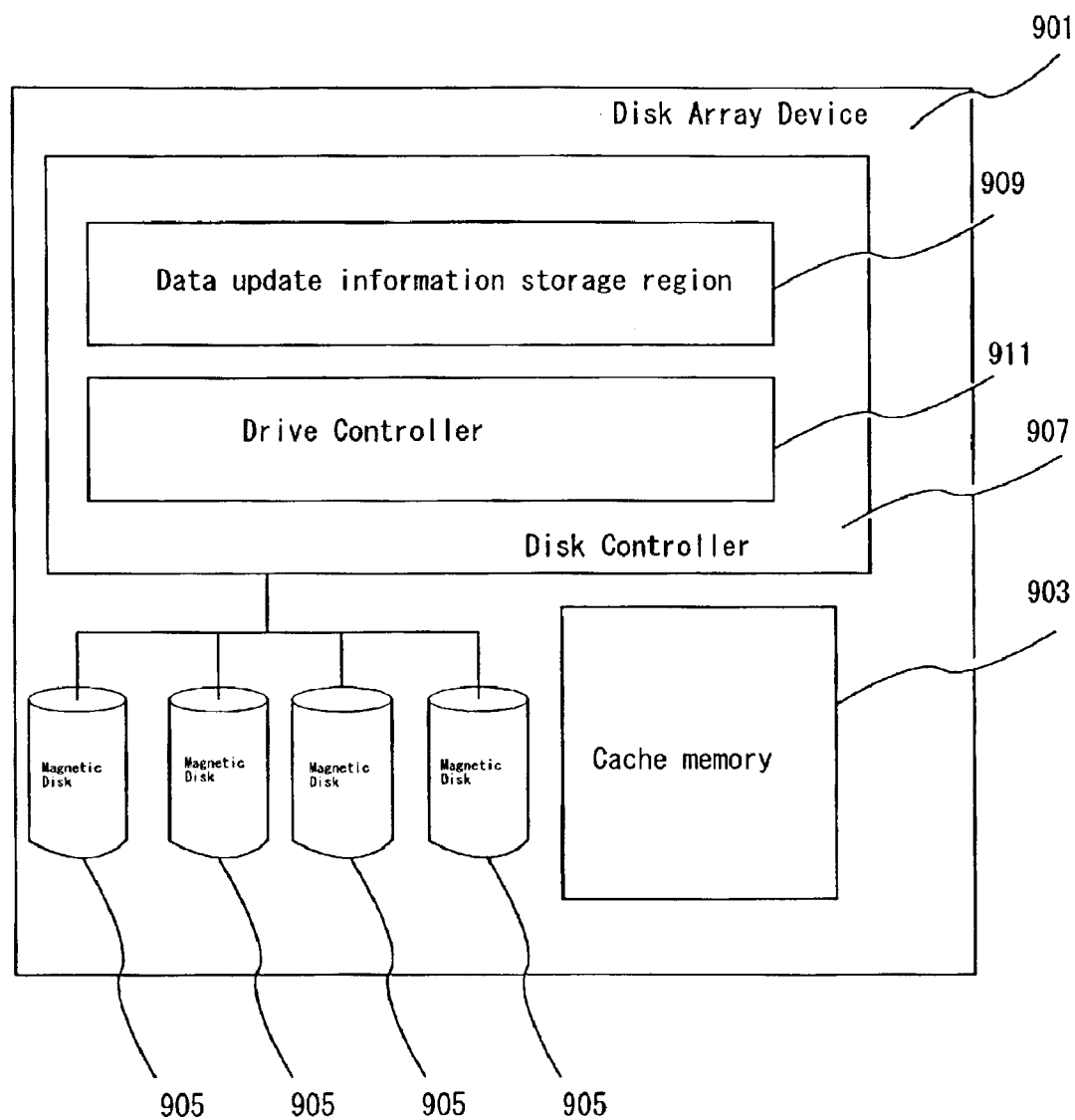
FIG. 9 is a diagram showing a schematic structure of a disk array device according to an embodiment of the present invention.

FIG. 9 shows a schematic structure of a disk array device described as an embodiment of a control device of the present invention. Disk array device 901 comprises a control memory (not shown), a cache memory 903, four magnetic disks 905 as storage devices, and a disk controller 907 that controls the magnetic disks 905. The disk controller 907 comprises a data update information storage region 909 which stores information related to write history data of the magnetic disks 905, and a drive controller 911 which controls the magnetic disks 905.

Embodiment 2

Figure 10:
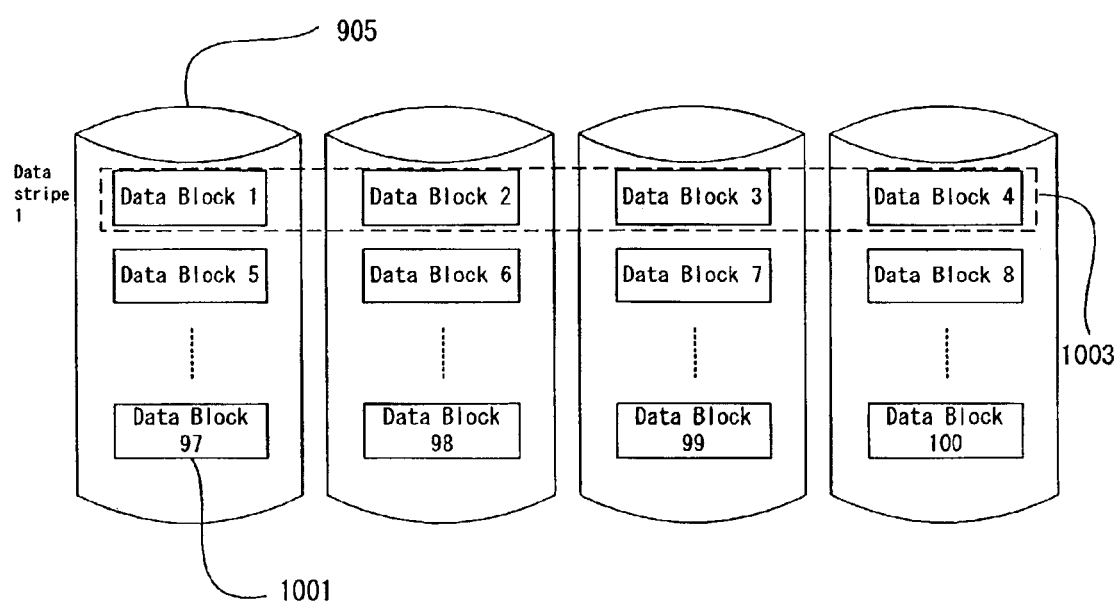
FIG. 10 is a diagram explaining the concept of data blocks and data stripes formed on the magnetic disk of the disk array device according to an embodiment of the present invention.
Figure 11:
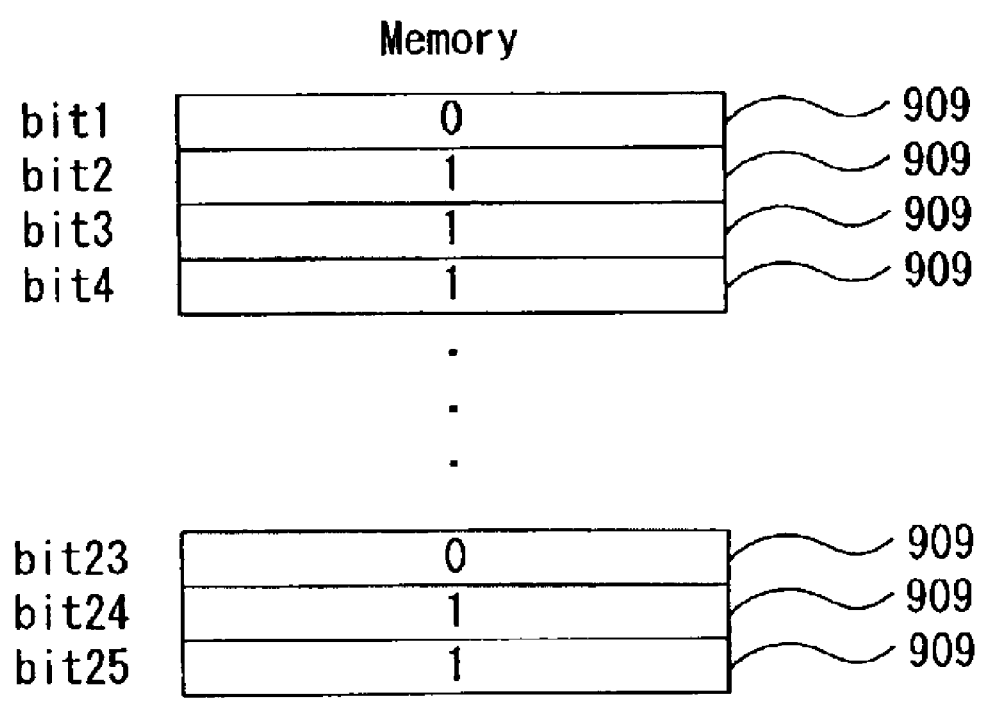
FIG. 11 is a diagram showing a data write history according to an embodiment of the present invention.

As shown in FIG. 10, in this embodiment each of the four magnetic disks 905 are provided with a storage unit referred to as a data block 1001. Each of the data blocks 1001 in different magnetic disks 905 form a plurality of groups referred to as a data stripe 1003, and as shown in FIG. 11, the disk array device 901 stores write history data 1003 in a control memory. In FIG. 11, for example, the value of "0" set in the data update information storage region 909 of bit 1 shows that data has not been written even once to the data stripe 1003 in the magnetic disk 905, which corresponds to bit 1. On the contrary, if "1" is set in the data update information storage region 909, it shows that data has been written at least once to the data stripe 1003.

Figure 12:
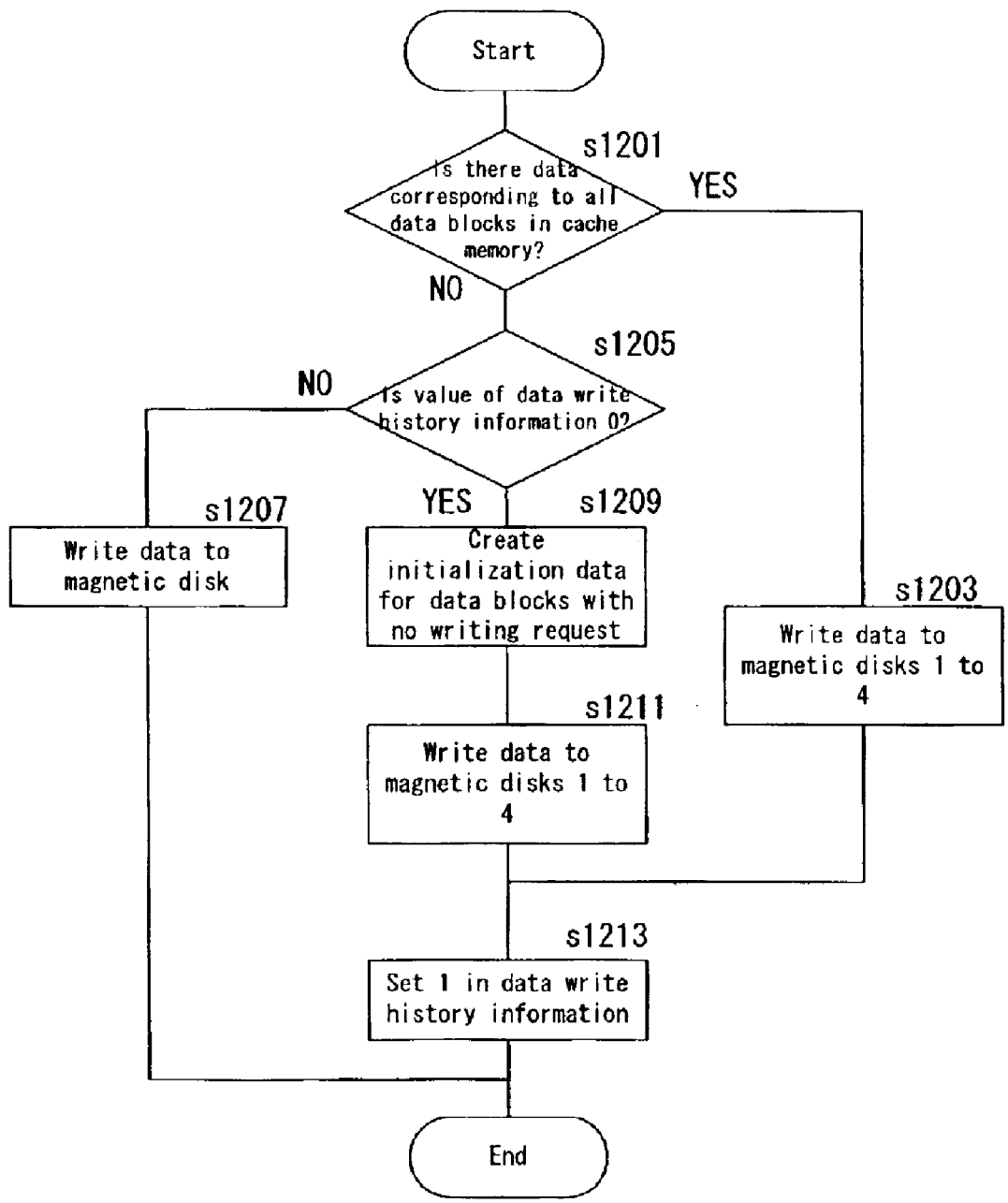
FIG. 12 is a flowchart describing operations of the disk array device according to an embodiment of the present invention.

FIG. 12 is a flowchart explaining the operations of the disk array device 901 in writing data to the magnetic disk.

When write data and a data write request to a data block 1001 (for example, data block 1 and 2) in a data stripe 1003 (for example, data stripe 1) of a magnetic disk 905 are sent from an external device (not shown), the disk controller 907 writes the data to the cache memory 903.

Next, the disk controller 907 checks whether there is write data for all the data blocks 1001 which form the data stripe 1003 to which the data block 1001 to be written to belongs. This means that the disk controller checks if write data exists to be written to all four data blocks 1001 (data blocks 1 to 4) in the data stripe 1003 (data stripe 1), at an appropriate timing such as the moment when responding to the write request (s1201). When write data exists corresponding to all data blocks 1001, the drive controller 911 writes this data to all data blocks 1001 of the magnetic disks 905 (s1203). Then, the disk controller 907 sets the data update information storage region 909 corresponding to the data stripe 1003 (data stripe 1) (s1213) to "1".

On the other hand, when write data does not exist in the cache memory 903 for all data blocks 1001 forming the data stripe 1003 to which the data blocks 1001 belong to (s1201), first, the disk controller 907 refers to the contents (write history) of the data update information storage region 909 corresponding to the data stripe 1003 (s1205).

When the value of the write history is "0" meaning data has not been written in the past, the disk controller 907 creates initialization data (for example, data such as "00") to be written to the data blocks 1001 which do not have pending writing requests (in this case data blocks 3 and 4) (s1209). The drive controller 911 then writes the four created data elements to the respective data blocks 1001 (data blocks 1 to 4) (s1211).

Next, the disk controller 907 sets "1" in the data update information storage region 909 corresponding to the data stripe 1003.

On the other hand, when the write history is referred to (s1205) and the value is "1", the driver controller 911 writes data obtained from the cache memory 903 to the predetermined data blocks 1001 (in this case data blocks 1 and 2) among the data blocks 1001 to which the respective data is written (s1207).

As described above, the disk array device 901 (control device) of the present invention writes initialization data to data blocks 1001 which are not yet formatted and formats it by writing data to the magnetic disk 905, so that there is no need to perform a logic format at the time of initial installation.

Figure 13:
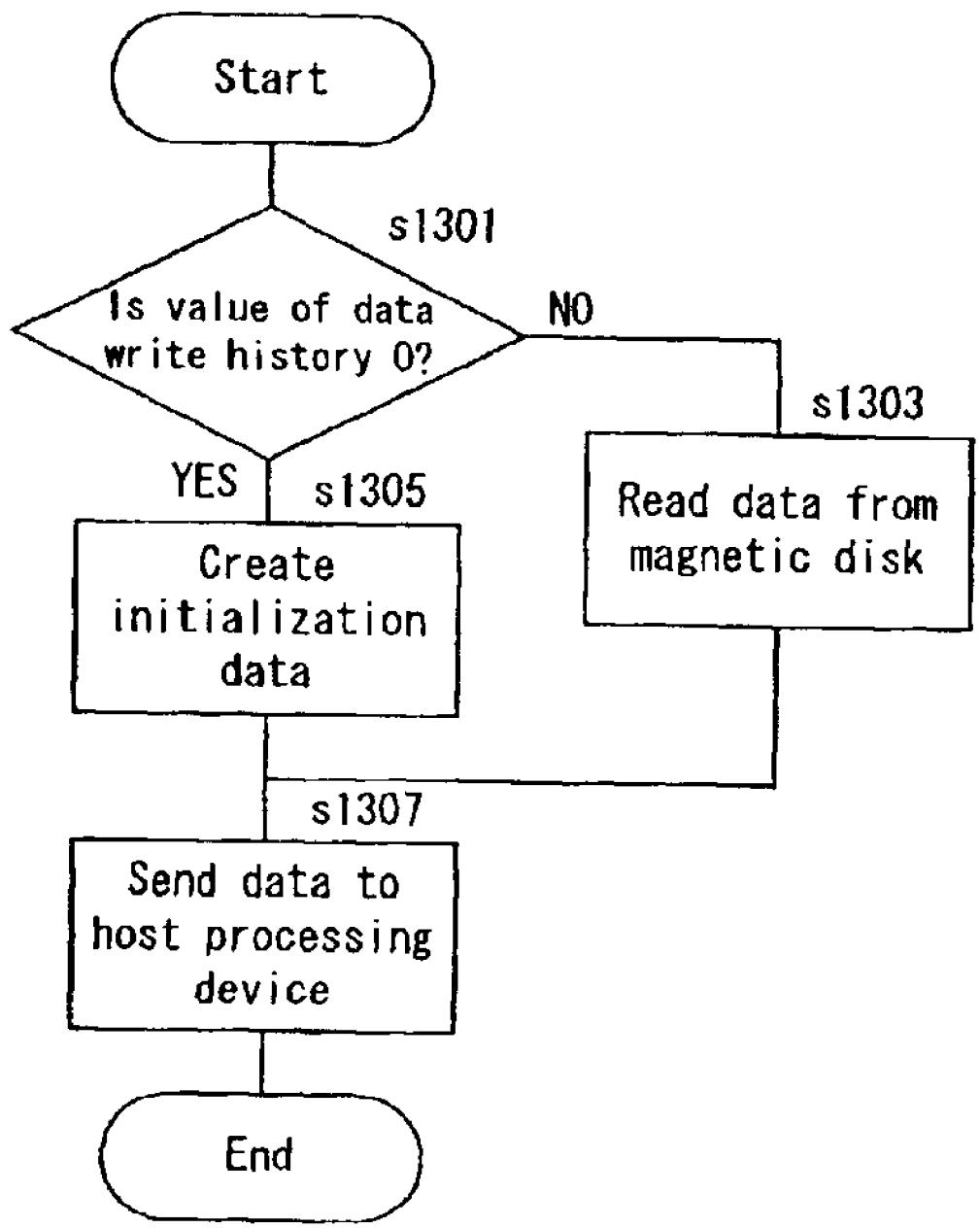
FIG. 13 is a flowchart explaining processes that are used when the disk array device receives a data read request from an external device according to an embodiment of the present invention.

Next, with the flowchart shown in FIG. 13, the process where a data reading request is received from an external device is described.

When the disk controller 907 receives a request to read data on the magnetic disk 905 from the external device, first, it refers to the write history of the data stripe 1003 corresponding to a data read portion designated by this request (s1301). When the value of data writing history is "1", meaning when data has already been written to the data stripe 1003, the disk controller 907 reads the data from the magnetic disk 905 (s1303), and sends the data to the external device (s1307).

On the other hand, when the write history is "0", meaning that no data has been written in the past to the data stripe 1003 corresponding to the data read position designated in the request, the disk controller 907 creates initialization data corresponding to data stripe 1003 (s1305), and sends the initialization data to the external device (s1307).

In this way, when a read request is issued to the data stripe 1003 whose data has not been initialized, the disk array device 901 sends initialization data instead of sending an error message. This mechanism is useful when, for example, the external device sends a data read request to the disk array device 901 at a time of initial program loading (IPL), and processing at the external device side should not end in an error state.

Incidentally, when data stored in a predetermined region of the magnetic disk 905 is to be copied to other regions or to other magnetic disks 905, if the above write history is used, copying may be efficiently carried out.

Figure 14:
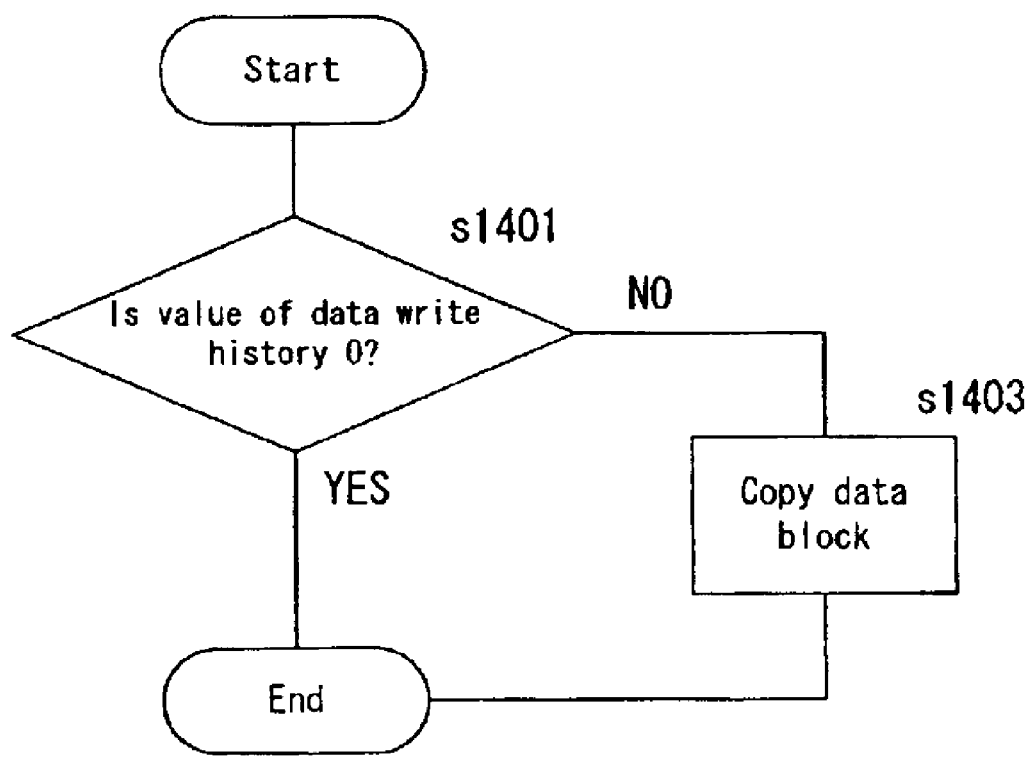
FIG. 14 is a flowchart explaining a copy process utilizing data write history according to an embodiment of the present invention.

FIG. 14 is a flowchart explaining a copy process utilizing the write history. When the disk array device 901 receives a request for copying data on the magnetic disk 905 sent from the external device, the write history information is first referred to (s1401). When the value of the write history is "1", meaning a write history exists, the drive controller 911 reads data from the magnetic disk 905 and performs a copy process regarding the data (s1403). On the other hand, when no write history exists and the write history is "0", the operation is ended.

Embodiment 3

Figure 15:
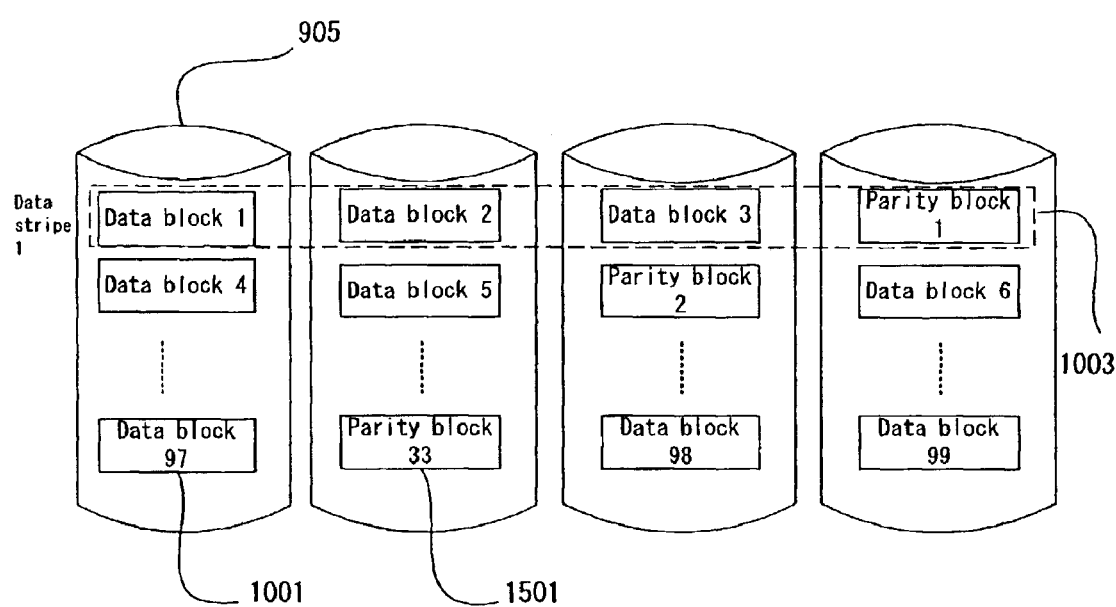
FIG. 15 is a diagram explaining the concept of data blocks, data stripes, and parity blocks formed on a magnetic disk of the disk array device according to an embodiment of the present invention.

As shown in FIG. 15, in this embodiment, one of the data blocks 1001 composing the data stripe 1003 shown in FIG. 10 is allotted as a parity block 701 (for example, parity block 1) in RAID.

Figure 16:
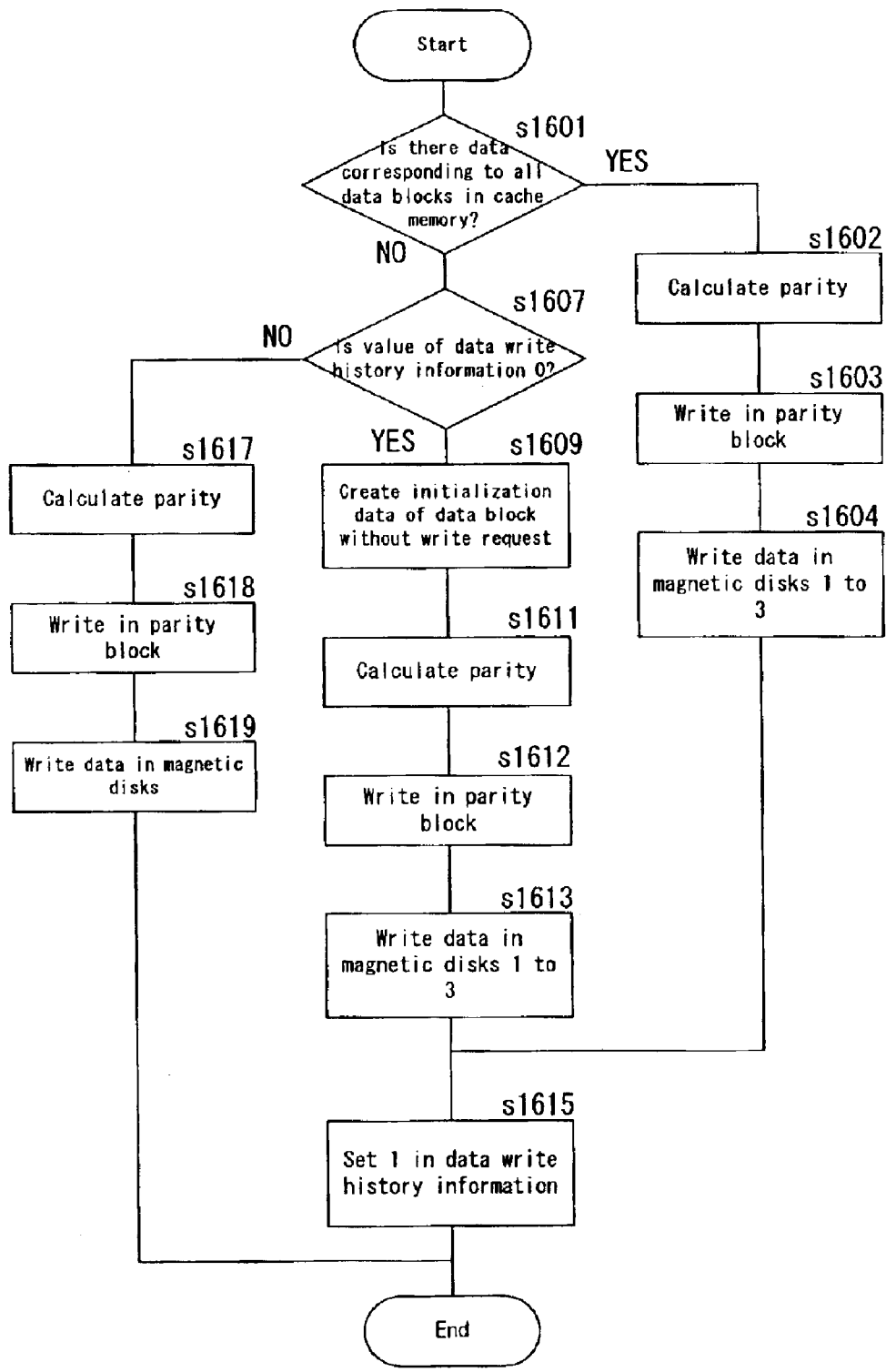
FIG. 16 is a flowchart explaining operations of the disk array device according to an embodiment of the present invention.

FIG. 16 is a flowchart explaining the operations of the disk array device 901 in this embodiment. When write data and a related write request to the data blocks 1001 (for example, data blocks 1 and 2) in the data stripe 1003 of the magnetic disk 905 are sent from the external device, the disk controller 907 temporarily stores the write data to the cache memory 903.

The disk controller 907 checks whether write data exists for all data blocks 1001 forming the data stripe 1003 to which the data block 1001 to be written to belongs. In other words, it checks whether write data to be written to all data blocks 1001 (data blocks 1 to 3) in this data stripe 1003 is stored in the cache memory 903 (s1601).

When write data exists to be written to all data blocks 1001 in the data stripe 1003 in the cache memory 903, the disk controller 907 calculates parity by using all the write data (s1603).

Next, the drive controller 911 writes the calculated parity to the parity block 701 (parity block 1) in the magnetic disk 905 (magnetic disk 4) (s1604), and writes write data of the cache memory 903 to the data blocks 1001 (data blocks 1 to 3) of the magnetic disks 905 (magnetic disks 1 to 3) (s805). Then, "1" is set in the data update information storage region 909 corresponding to the data stripe 1003 (data stripe 1) (s1615). In the case where write data does not exist for all the data blocks 1001 which forms the data stripe to which the data blocks 1001 to be written to belong, the disk controller 907 first refers to the contents of the data update information storage region 909 (s1607).

When the value of the data update information storage region 909 is "0" when no data has been written in the past, for data blocks 1001 which have no writing request, the disk controller 907 creates initialization data to be written to those data blocks 1001 (s1609).

Next, parity is calculated by using data to be written to the data block 1001 and the initial data that is created (s1611), and the calculated parity is written to the parity block 1003 (s1612). Then the write data of the cache memory 903 and the initial data which is created is written to the data blocks 1001 of the magnetic disks 905 (s1613), and "1" is set in the data update information storage region 909 corresponding to the data stripe 1003 (s1615).

Further, when "0" is set in the data update information storage region 909 (s1607) when no data has been written in the past, the disk controller 907 calculates parity using write data, data already written to the data blocks 1001 to be written to, and parity at that time (s1617), and writes the newly calculated parity in the parity block 701 (s1617). Then, the write data is written to the appropriate data block 1001 (s1619).

According to the present invention, use of a control device such as a disk array device is made possible without performing a logic format at the time of initial installation.

There has been detailed description of the preferred embodiments of the present invention, and it is to be understood that various changes, replacements, or exchanges are possible without departing from the true spirit and scope of the present invention as determined in the scope of the invention.

What is claimed is:

1. A disk array device connected to an external device, comprising a plurality of disk devices and a control device controlling the disk devices, said control device comprising:
- request receiving means for receiving a request from said external device;
- formatting means for performing a format process to said disk device according to said received request;
- read means for performing a data reading process in response to said received request;
- write means for performing a data writing process in response to said received request;
- a write history management table for recording a history of said performed writing process to said disk device in block units; and
- a cache memory for temporarily storing data; wherein
- said formatting means refers to said write history management table, confirms whether or not said writing process has been performed with regard to blocks to be formatted, performs said format process only to said blocks on which writing processes have not been performed, and records a history of completing said writing process of said formatted blocks in said write history management table, and
- in a state of performing said formatting means, if said request receiving means receives a request said to perform reading process and/or writing process from said external device, said read means and/or write means refers to said write history management table, and only when writing processes have been performed on the block to be written to, accesses said disk array device to perform said reading process and/or said writing process to said block; and wherein
- in a state of performing said formatting process,
  - if said request receiving means receives a request from said external device to perform said reading process, said read means refers to said write history management table, and
  - if said writing processes have not been performed on a block to be read, then said read means creates predetermined data, said predetermined data is stored in said cache memory, and said data from said cache memory is sent to said external device.

2. A disk array device as claimed in claim 1 further comprising:
- a cache memory for temporarily storing data,
- wherein in a state of performing said formatting process, said request receiving means receives a request from said external device to perform said writing process, said write means refers to said write history management table, and
- if writing processes have not been performed on a block to be written, then said write means stores said write data sent from said external device in said cache memory, and writes a history of performing said writing process to said block to be written in said write history management table.

3. A disk array device as claimed in claim 1, wherein said request receive means receives said request from said external device to perform said format process, and said formatting means reports the completion of said format process to said external device before actually performing the format process to said disk device.

4. A control method of a disk array device which has a plurality of disk devices and is connected to an external device, said disk array device comprising a cache memory for temporarily storing data, said control method comprising:
receiving a request from said external device to perform a format process, referring to a write history management table in which histories of performed writing processes are recorded in block units and confirming whether or not a data writing process has been performed with regard to a block to be written;
performing said format process to blocks to which writing processes have not been performed without performing said format process to blocks to which writing processes have been performed, and recording a history of performing said writing process to the formatted blocks in said write history management table; and
while performing said format process, receiving a request to perform a reading process and/or writing process from said external device, referring to said write history management table, and
only if writing processes have been performed on said block, then performing said reading process and/or said writing process to said block;
said control method further comprising:
upon receiving a request from said external device, while conducting said format process, to perform said reading process,
referring to said write history management table, and
if said writing processes have not been performed on said block to be written, creating predetermined data, storing said predetermined data in said cache memory, and sending said predetermined data from said cache memory to said external device.

5. A control method of a disk array device as claimed in claim 4, said disk array device comprising a cache memory for temporarily storing data, said control method further comprising:
receiving a request from said external device to perform said writing process while performing said format process;
referring to said write history management table;
if said writing processes have not been performed on said block to be written, storing said write data sent from said external device in said cache memory, and recording a history of completing said writing process to said block in said write history management table.

6. A control method of a disk array device as claimed in claim 4, further comprising:
receiving a request from said external device to perform said format process by said request receiving means, and
reporting the completion of said format process to said external device before said formatting means actually performs said format process on said disk device.

7. A control method of a control device controlling input and output of data to a plurality of storage devices, comprising:
performing input and output on a data block unit basis to and from a storage region of a storage device partitioned into data blocks;
storing an indication of whether or not writing of data has been performed in the past for data stripes each formed by data blocks over said plurality of storage devices; and
if writing write data to said storage device and writing has not been performed on the data stripe to which data blocks requested to be written to belong, then writing said write data to said data blocks to be written to and writing initialization data to the other data blocks in the data stripe that are not required to be written to, thus writing data to all data blocks forming the data stripe;
said control method further comprising:
upon receiving a request to read data with said control device from an external device connected to said control device,
if a writing process has not been performed in the past to said data stripe to which said data block to be read belongs, then sending said initialization data to said external device.

8. A control method of a control device as claimed in claim 7, further comprising:
operating said storage devices in a RAID configuration; and
utilizing one of said data blocks in said data stripe as a parity block storing parity data.

9. A control method of a control device as claimed in claim 7, comprising:
in a case that said control device copies data between said storage devices, only copying data from a data stripe from among those data stripes to be copied on which a writing process has been performed in the past.

10. A control method of a control device controlling input and output of data to a plurality of storage devices, comprising:
performing data input and output to a storage device through a cache memory;
performing input and output of data on a data block unit basis to and from a storage region of a storage device partitioned into data blocks;
storing an indication of whether or not writing of data has been performed in the past for data stripes each formed by data blocks over the plurality of storage devices; and
in writing data to said storage device, if data exists in a cache memory to be written for all data blocks forming a data stripe to which data blocks to be written to belong, then writing data to be written for all data blocks to a storage device,
alternatively, if data does not exist in a cache memory to be written for all data blocks forming a data stripe to which data blocks are to be written to and writing of data has not been performed in the past to said data stripe to which said data blocks to be written to belong, then writing said data to said data blocks to be written to and writing initialization data to the other data blocks belonging to the data stripe to which said data block to be written to belongs;
the control method further comprising:
upon receiving a request to read data with said control device from an external device connected to said control device,
if a writing process has not been performed in the past to said data stripe to which said data block to be read belongs, then sending said initialization data to said external device.

11. A control method of a control device as claimed in claim 10, further comprising:
operating said storage devices in a RAID configuration; and
utilizing one of said data blocks in said data stripe as a parity block storing parity data.

12. A control method of a control device as claimed in claim 10, comprising:
in a case that said control device copies data between said storage devices, copying data from a data stripe from among those data stripes to be copied on which a writing process has been performed in the past.

* * * * *